United States Patent

[11] 3,569,806

[72] Inventor Harrison D. Brailsford
 670 Milton Road, Rye, N.Y. 10580
[21] Appl. No. 765,873
[22] Filed Oct. 8, 1968
[45] Patented Mar. 9, 1971

[54] STARTING ARRANGEMENT FOR SOLID-STATE COMMUTATED MOTOR
6 Claims, 3 Drawing Figs.

[52] U.S. Cl. .................................................... 318/254,
 318/439
[51] Int. Cl. .................................................... H02k 29/00
[50] Field of Search ............................................. 318/138,
 254, 439, 20.60 (S)

[56] References Cited
 UNITED STATES PATENTS
| | | | | |
|---|---|---|---|---|
| 3,204,165 | 8/1965 | Kreutzer | | 318/138 |
| 3,299,335 | 1/1967 | Wessels | | 318/138 |
| 3,345,547 | 10/1967 | Dunne | | 318/234 |
| 3,377,534 | 4/1968 | Hill | | 318/138 |
| 3,412,303 | 11/1968 | Rakes | | 318/138 |
| 3,453,514 | 7/1969 | Rakes et al. | | 318/138 |

Primary Examiner—G. R. Simmons
Attorney—March, Gillette & Wyatt

ABSTRACT: A circuit comprising a solid-state commutating means in an oscillatory circuit for a direct current motor. The circuit includes photosensitive means actuated by electric light means gated by the rotor and connected to modify the feedback as the amount of illumination striking the photosensitive means varies in response to the gating. The change in feedback controls the current in the circuit to provide proper starting and running currents. In particular the solid-state commutating means may be in the form of a circuit similar to a flip-flop with separate stator coils in series with the active elements of the flip-flop and with feedback resistors connecting the output of one part of the flip-flop to the input of the other. The photosensitive means include photoconductive cells connected to change the effective impedance of the feedback resistors and means may be included so that, after the motor has gotten started, the amount of current through the electric light may be reduced to a value too low to cause incandescence or the current may even be turned off entirely.

PATENTED MAR 9 1971 3,569,806

INVENTOR
HARRISON D. BRAILSFORD

STARTING ARRANGEMENT FOR SOLID-STATE COMMUTATED MOTOR

This invention relates to a starting arrangement and circuit for use with a motor commutated by a solid-state circuit. In particular the invention relates to a starting arrangement using an incandescent lamp, photosensitive means connected to the solid state circuit, and a rotating barrier to control the transmission of light from the lamp to the photosensitive means to control, in turn, the conductivity of the solid-state circuit so as to effect a relatively high torque to start the motor, after which current through the lamp may automatically be reduced.

In starting a DC motor that has a solid-state commutating circuit one of the difficulties is to produce sufficient initial conductivity of the proper part of the circuit to cause the rotor to start under load and in the right direction. Heretofore mechanical contacts have been used to control the conductivity of the circuit during the starting period. However such mechanical starting devices do have, even if only to a minor extent and for a relatively short period of time, the disadvantages of mechanical commutation and, in addition, certain mechanical complexities which should be avoided if possible. In the present invention no mechanical contacts are employed for starting the motor so that operation is unaffected by either high vacuum or explosive environments.

The starting arrangement of the present invention is preferably used in conjunction with the type of motor shown in my U.S. Pat. Nos. 3,264,538 and 3,333,172. The motor described in these patents includes a permanent magnet rotor having pole areas permanently magnetized in diametrically opposite locations and a stator of ferromagnetically soft material having poles properly angularly oriented and having stator windings capable of being energized in the proper time relationships to induce magnetic flux in the stator poles to interact with flux from the rotor poles and cause the rotor to rotate. Current to the stator windings is controlled by a circuit using solid-state elements in a modified flip-flop connection with the solid-state elements connected to control the current through the stator coils. The circuit includes means to produce positive feedback from one of the solid-state elements to the other, but during normal operation when the motor is up to speed, voltages induced in the driving coils by the rotor poles control the operation of the circuit to produce correct timing of the commutated current.

In accordance with the present invention a source of illumination is provided along with photosensitive cells and a barrier attached to the rotor to rotate therewith between the source of illumination and the photosensitive cells. The cells are connected to control the conductivity of the solid-state elements through modification of the feedback in the proper relationship to produce good torque during the starting interval. After the motor has reached a sufficiently high speed, the normal electrical pulses produced in the stator coils by the rotor flux take over control of the solid-state elements to keep the motor running. The source of illumination may be connected in series with the power source for the motor so that back e.m.f. produced when the motor is running will reduce the power supplied to the source of illumination to cause it to go dark when the light is not needed. Other circuit means may also be provided to reduce current through the source of illumination when the motor has reached a speed high enough so that the light is no longer The invention will be described in greater detail in connection with the drawings in which:

Figure 1:
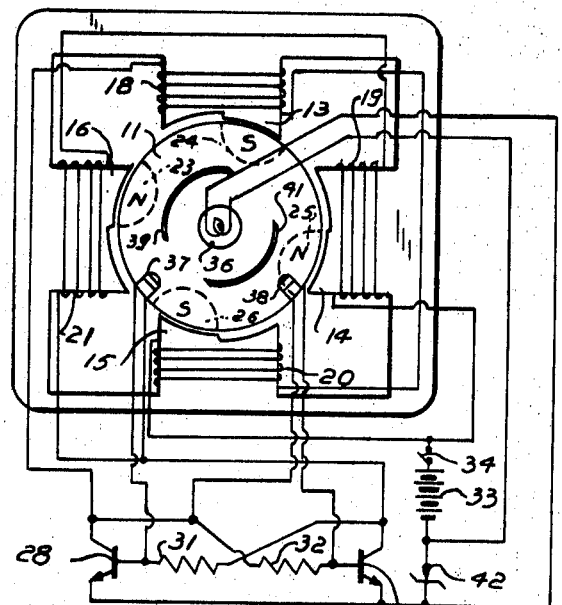
FIG. 1 is a schematic presentation of a motor constructed according to the present invention.

The motor in FIG. 1 comprises a permanently magnetized rotor 11 rotatably suspended within a stationary field structure 12 by a conventional support structure. The stationary field structure 12 is made of magnetically soft material, such as silicon steel and is formed with four salient poles 13—16. Each pole has a stator coil of magnet wire wound thereon as indicated by reference numerals 18—21, respectively, and so interconnected that opposite windings are in series-opposition. The rotor may be of Alnico or any other suitable magnetic material capable of having poles permanently magnetized in limited areas of the perimeter thereof. In this case there are four rotor poles 23—26 of which the poles 23 and 25 are north poles and the other poles 24 and 26 are south poles. The rotor poles are so arranged that the two north poles 23 and 25 are directly diametrically opposite each other and the two south poles 24 and 26 are also diametrically opposite each other and midway between the two north poles.

The commutating portion of the circuit comprises a pair of transistors 28 and 29 having their emitters connected directly together. The collector of the transistor 28 is connected in series with coils 18 and 20, and the collector of the transistor 29 is connected in series with the coils 19 and 21. The base of the transistor 28 is connected by way of a resistor 31 to the collector of the transistor 29 and the base of the transistor 29 is similarly connected by a resistor 32 to the collector of the transistor 28 to provide the necessary cross-coupling and positive feedback between the transistors. The circuit is powered by a battery 33 connected in series with a switch 34 and the commutating circuit comprising two transistors 28 and 29 and the respective pairs of coils 18, 20, and 19, 21.

The starting arrangement comprises a lamp 36 and two photocells 37 and 38 angularly spaced apart approximately 90° and located adjacent the rotor 11. The lamp 36 is located on the axis of the rotor, and two opaque shields 39 and 41 are attached to the rotor to traverse a circular path between the lamp 36 and the two photocells 37 and 38. Each of the two light shields 39 and 41 is one-fourth of a cylindrical shell, and they are symmetrically spaced apart on diametrically opposite sides of the axis of the rotor. The photocell 37, which in the present embodiment may be a photoconductive cell, is connected directly in parallel with the resistor 13 while the other photocell 38 is connected directly in parallel with the resistor 32. A Zener diode 42 is connected in series with the battery 33 and directly in parallel with the lamp 36 in the present embodiment.

The operation of the motor and starting circuit in FIG. 1 is as follows: When the motor is at rest, the rotor 11 will assume one of two independent positions due to the magnetic attraction between the rotor poles 23—26 and the stator poles 13—16. Although the rotor 11 may actually come to rest in any one of four positions, only two of these positions can actually be considered as being different and are therefore referred to as being independent positions. In the position shown in FIG. 1 the north poles 23 and 25 of the rotor are adjacent the stator poles 13 and 15, while the south poles 24 and 26 are adjacent the stator poles 14 and 16. The other independent position would be with the rotor 11 turned 90° from the position shown in FIG. 1 so that the north poles 23 and 25 were close to the stator poles 13 and 15 and the south poles 24 and 26 were close to the stator poles 14 and 16. Rotation of the rotor still another 90° would bring the rotor back to the equivalent of the position shown in FIG. 1, or at least indistinguishable from it insofar as magnetic and electrical components of the motor were concerned.

The field coils 18—21 in conjunction with the transistors 28 and 29 and the resistors 31 and 32 form a simple multivibrator, or flip-flop, circuit. The circuit parameters, including the magnetic couplings between the coils, determine the normal electronic oscillating frequency of the circuit, and if the circuit parameters and the voltage of the battery 33 are of the proper values, the circuit will oscillate at a frequency too high to impart motion to the rotor 11. All of the current for the two transistors 28 and 29 would, in the absence of the Zener diode 42, flow through the lamp 36. In fact, the resultant voltage drop across the lamp might exceed the rated voltage of the lamp and therefore the Zener diode 42 is connected in parallel with the lamp to limit this voltage drop to the rated voltage of the lamp. The lamp 36 is chosen to have a rated voltage which is relatively small with respect to the total voltage of the battery 33. Typical values would be about 24 volts for the battery 33 and about 5 volts for the lamp 36 and the Zener diode 42.

With the rotor 11 in the position shown, light is prevented by the barrier 41 from falling on the photocell 38 but does illuminate the photocell 37, causing the impedance of the latter to drop to a relatively lower value. Since the photocell 37 is in parallel with the resistor 13, a relatively high bias is thereby applied to the base of the transistor 28 to render that transistor conductive. As a result, a substantial current is drawn through the coils 18 and 20, which are in series with the emitter-collector output circuit of the transistor 28. This current produces a magnetic field that causes the stator poles 13 and 15 to become south poles and the stator poles 14 and 16 to become north poles, and the rotor 11 starts to revolve clockwise.

When the rotor 11 has advanced somewhat less than 90° the leading edge of the shield 41 interrupts light traveling from the lamp 36 to the photocell 37, reducing the conductivity of the photocell 27 as the amount of illumination striking it decreases. At the same time the trailing edge of the shield 41 moves away from the direct path between the lamp 36 and the photocell 38 allowing light from the lamp to begin reaching the photocell 38, which reduces the resistance of the latter and permits a positive biasing signal to be applied to the base of the transistor 29 to make the latter conductive. Current then begins to flow through the coils 19 and 21 in series with the emitter-collector output circuit of the transistor 29 in a direction to reverse the polarity of the magnetic fields in the stator poles at the proper time to provide a magnetic impulse that gives further impetus to the rotation of the rotor 11. After a few such impulses the rotor 11 will have accelerated to a speed such that the magnetically induced impulses in the stator coils 18—21 will control the conductivity of the transistors 28 and 29. Thereafter, the effect of the photocells 37 and 38 will be negligible and the rotor 11 will continue to rotate as conductivity is transferred back and forth between the transistors 28 and 29, commutating current in the stator coils in series therewith in the manner described in my U.S. Pat. Nos. 3,264,538 and 3,333,172.

The rotating poles also produce a back e.m.f. in the stator windings, and this back e.m.f. opposes the battery voltage and reduces the current that must be supplied by the battery 33. The initial current supplied by the battery may, for example, be five or six times as great as the current required after the rotor has reached its normal operating speed. This low current value is not sufficient to cause the lamp 36 to remain incandescent, and the lamp will go out. The filament of the lamp 36 will therefore not be subject to deterioration while the motor is running at its normal speed, and the lamp will have a useful service life equal to or in excess of that for the mechanical part of the motor.

Figure 2:
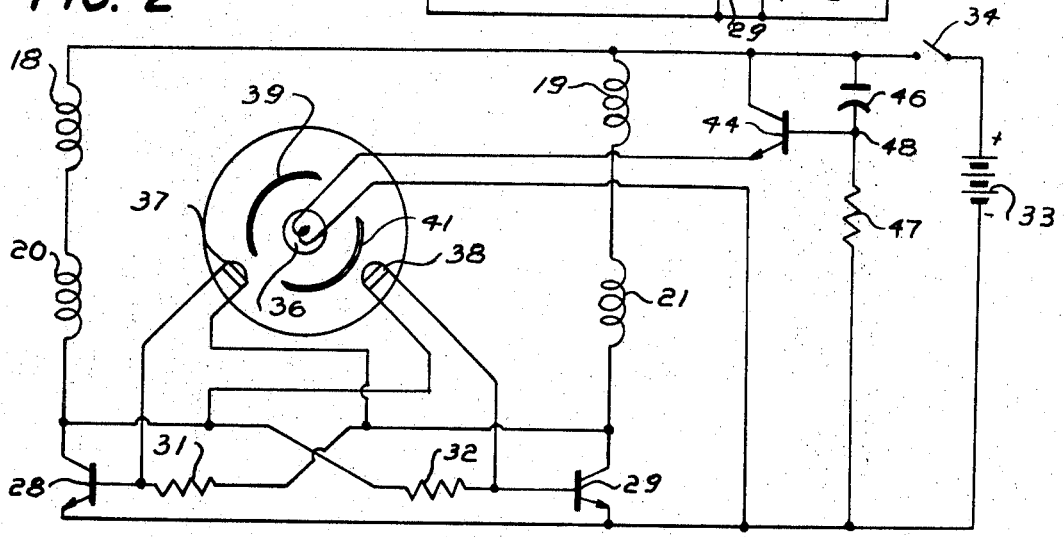
FIG. 2 is a schematic circuit diagram of a different embodiment of the starting arrangement shown in conjunction with the motor in FIG. 1.

FIG. 2 shows a motor with a commutating circuit similar to that of the motor in FIG. 1, except that, instead of a Zener diode, the circuit in FIG. 2 has a control transistor 44 that has its emitter-collector output circuit in series with the lamp 36. A capacitor 46 and resistor 47 are connected in series between the switch 34 and the negative terminal of the battery 33 so that when the switch is closed, the capacitor 46 begins to charge, and the voltage at the junction 48 between the capacitor and the resistor begins to rise. The base of the transistor 44 is connected to the junction 48, and at some level determined by the characteristics of the transistor and the voltage drop across the lamp 36, the voltage at the junction 48, will reach a level that causes the transistor to become nonconductive and the lamp 36 to be extinguished. The time constant of the capacitor 46 and the resistor 47 and the voltage at which the transistor 44 becomes nonconductive can be selected so that the lamp 36 will stay illuminated along enough to be sure that the rotor 11 has reached operational speed.

Figure 3:
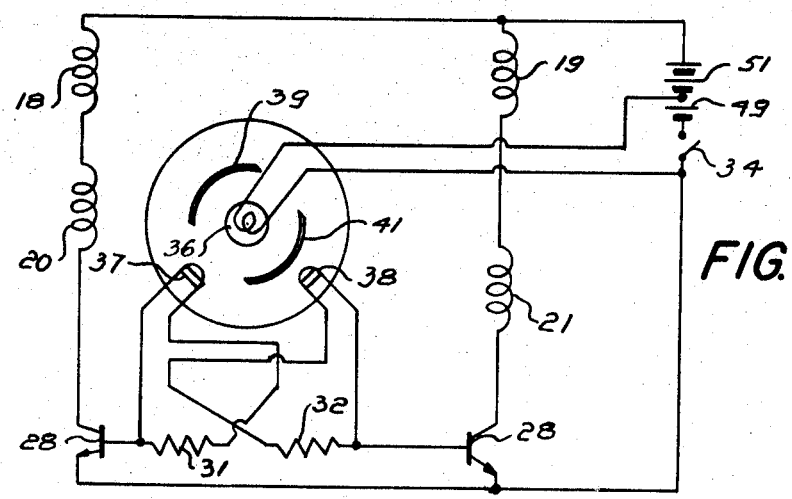
FIG. 3 is a schematic diagram of another embodiment of the invention.

FIG. 3 shows a modified circuit in which a low-power lamp 36 remains on all the time the switch 34 is closed. In this embodiment the lamp is a low-power device and does not need the full voltage that operates the motor. An extra battery 49 of, for example, 1.5 volts may be connected in series with the main battery 51 as a separate power source for the lamp 36 or the battery 49 may be one cell of the main battery. There are lamps of such low power although the lamp 36 in this embodiment would form a continuous power drain, there are small lamps of such low power consumption available for this purpose that the power drain would be negligible for most uses.

I claim:
1. A motor comprising:
  a. a permanent magnetic rotor having an even number of equally spaced magnetized pole areas;
  b. a stator comprising a ferromagnetically soft member having an even number of stator poles;
  c. first and second stator windings on said member to induce magnetic flux in said poles in predetermined polarities when electric current flows in a predetermined direction in said windings;
  d. a solid-state commutator circuit comprising first and second solid-state devices each having an output section connected in series with said first and second windings, respectively, and an input section, and a feedback circuit comprising a first impedance connecting the output section of said first solid-state device to the input section of said second solid-state device and a second impedance connecting to the input section of said first solid-state device to cause said commutator circuit to be self-oscillatory;
  e. electric light means;
  f. first and second photocell means connected to said first and second impedances, respectively, to change the feedback when illumination from said light means strikes said photocell; and
  g. barrier means attached to said rotor to rotate therewith and located to traverse a path between said light means and said photocell means as said rotor rotates, said barrier comprising edges defining an opening fixed with respect to said rotor poles areas, said stator poles, and said photocell means to permit light from said light means to strike one of said photocell means at any stopping position of said rotor whereby said one of said photocell means will be actuated by said light to energize said stator windings to start said rotor.

2. The motor of claim 1 in which:
  a. said barrier traverses a circular path and comprises first and second sections each intercepting an angle of approximately 90° from the center of said path, said sections being located on substantially diametrically opposite sides of said center; and
  b. said photocells are angularly spaced substantially 90° apart around said circular path whereby light from said light means is divided by said barrier sections into pulses of light reaching said photocells, each of said photocells receiving two pulses of light per revolution of said barrier, the pulses of light reaching said first photocell substantially only during intervals when pulses of light are not reaching said second photocell.

3. The motor of claim 2 in which said photocells are photoconductive and are connected, respectively, in parallel with said first and second impedances.

4. The motor of claim 3 in which said light means comprising an incandescent lamp connected electrically in series with said stator windings, whereby the sum of current flowing in said first and second windings flows through said lamp.

5. The motor of claim 4 comprising in addition a solid-state voltage limiting device connected directly in parallel with said lamp.

6. The motor of claim 2 comprising, in addition:
  a. a transistor having an output section connected in series with said light means as a first series circuit; and
  b. a resistor and capacitor connected in series as a second series circuit in parallel with said first series circuit, said transistor comprising an input section connected to said second series circuit whereby said transistor will be conductive from the time a voltage is applied across said first and second series circuits until the voltage at the junction of said resistor and capacitor reaches a predetermined level and makes said transistor nonconductive to halt the flow of current through said light means.